(12) United States Patent
Schuknecht et al.

(10) Patent No.: US 11,988,260 B2
(45) Date of Patent: May 21, 2024

(54) TORQUE LIMITING MECHANISM FOR SOLAR TRACKING SYSTEMS

(71) Applicant: Array Technologies, Inc., Albuquerque, NM (US)

(72) Inventors: Nathan Schuknecht, Golden, CO (US); Nikhil Kumar, Albuquerque, NM (US)

(73) Assignee: ARRAY TECHNOLOGIES, INC., Albuquerque, NM (US)

( * ) Notice: Subject to any disclaimer, the term of this patent is extended or adjusted under 35 U.S.C. 154(b) by 0 days.

(21) Appl. No.: 18/322,869

(22) Filed: May 24, 2023

(65) Prior Publication Data

US 2023/0383794 A1 Nov. 30, 2023

Related U.S. Application Data

(60) Provisional application No. 63/365,318, filed on May 25, 2022.

(51) Int. Cl.
*H02S 20/23* (2014.01)
*F16D 7/02* (2006.01)
*F16M 13/02* (2006.01)
*H02S 20/32* (2014.01)

(52) U.S. Cl.
CPC ........... *F16D 7/021* (2013.01); *F16M 13/022* (2013.01); *H02S 20/32* (2014.12)

(58) Field of Classification Search
None
See application file for complete search history.

(56) References Cited

U.S. PATENT DOCUMENTS

| | | | |
|---|---|---|---|
| 2007/0246095 A1* | 10/2007 | Schaefer | H02S 40/42 136/246 |
| 2014/0174499 A1* | 6/2014 | Fitzgerald | H02S 20/32 136/246 |
| 2015/0234031 A1 | 8/2015 | Corio | |
| 2015/0316639 A1* | 11/2015 | Russ | H02S 20/00 250/203.4 |

(Continued)

FOREIGN PATENT DOCUMENTS

| | | |
|---|---|---|
| JP | H10100912 A | 4/1998 |
| WO | 2016195748 A1 | 12/2016 |

OTHER PUBLICATIONS

International Search Report and Written Opinion mailed Aug. 28, 2023 in related PCT App. No. PCTUS2023023568.

*Primary Examiner* — Steven M Marsh
(74) *Attorney, Agent, or Firm* — MASCHOFF BRENNAN

(57) ABSTRACT

Torque limiters prevent the transmission of excessive torque between moving components of one or more gears in a tracker drive assembly. When an amount of torque between these moving components exceeds a threshold, the torque limiter may slip, thus allowing the components to move relative to each other. Embodiments disclosed herein may include a drive motor configured to rotate a drive shaft, at least one gear configured to translate rotation of the drive shaft into rotation of a PV module mounting structure, and a torque limiter interposed between an interior surface of a first component of the at least one gear and an exterior surface of a second component of the at least one gear to allow the first component to slip relative to the second component when an amount of torque between the first and second components exceeds a threshold.

20 Claims, 14 Drawing Sheets

(56) References Cited

U.S. PATENT DOCUMENTS

| | | | |
|---|---|---|---|
| 2018/0062564 A1* | 3/2018 | Grushkowitz | F16H 19/001 |
| 2018/0091088 A1* | 3/2018 | Barton | F24S 30/425 |
| 2018/0091089 A1* | 3/2018 | Lange | H02S 20/32 |
| 2018/0254740 A1 | 9/2018 | Corio | |

* cited by examiner

TORQUE LIMITING MECHANISM FOR SOLAR TRACKING SYSTEMS

CROSS-REFERENCE TO RELATED APPLICATION

This application claims priority under 35 U.S.C. § 119 to U.S. Provisional Application No. 63/365,318, filed May 25, 2022, the entire disclosure of which is incorporated herein by reference.

TECHNICAL FIELD

The present disclosure relates to torque limiting mechanisms that can be implemented in solar tracking systems.

BACKGROUND

Solar farms, photovoltaic (PV) plants, and other solar energy systems where large numbers of PV modules collect sunlight and generate energy are becoming more common. In some of these systems, multiple PV modules may be coupled to a PV module mounting structure, which is mounted on one or more support structures, or piles. Mounting interfaces may be used to secure a PV module mounting structure to the support structures. In solar tracking systems (or systems in which the PV modules are able to track a location of the sun throughout the day), the PV module mounting structure is coupled to the mounting interface in a way that permits the PV module mounting structure to rotate relative to the support structure. A tracker drive assembly, including a drive motor and one or more gears, may be used to selectively rotate the PV module mounting structure and PV modules coupled thereto. Changing the angle of a PV module with respect to a support structure enables the PV module to track the location of the sun and maximize efficiency.

While rotating a PV module mounting structure to change an angle of PV modules enables the PV modules to track the location of the sun and increase the efficiency of the system, this rotational freedom can also create undesirable effects. For example, wind, uneven snow buildup, seismic activities, and other events can cause a torque to be applied to the tracker drive assembly. If the torque is sufficiently large, the tracker drive can be damaged, or break. For example, if a gust of wind hits a row of PV modules that are coupled to a PV module mounting structure, the rotational torque generated by the wind may be transferred to and damage the components, such as the gears, of the tracker drive assembly.

Existing clutch systems have a large number of moving parts and often include a large difference between a static slip torque and a dynamic slip torque. This causes slipped clutches in existing systems to come to a stop with more force and/or may accelerate more quickly because less friction is present to reduce the speed of rotation of tracker drive assembly components. Accordingly, there is a need for an improved torque limiter that reduces rotational torque on tracker drive assemblies and that does not require a large number of moving parts.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address problems experienced in conventional solar tracking systems, including problems associated with damage to tracker drive assemblies caused by torque from wind, uneven snow buildup, seismic activities, and other events. Embodiments disclosed herein address this problem by providing a torque limiter that is simple to manufacture, operate, and install. In addition, torque limiters of the present disclosure may reduce the difference between a static slip torque and a dynamic slip torque, thus stopping slippage more quickly than clutch mechanisms with greater static and dynamic slip torque differences. Additionally, reducing the difference between the static slip torque and the dynamic slip torque may reduce a speed at which a first component in a gear moves and eventually contacts a second component of the gear to prevent further rotation of the gear, which may reduce damage to the components of the tracker drive assembly.

Torque limiters of the present disclosure include friction rings that may be interposed between moving components of one or more gears in a tracker drive assembly. When an amount of torque between these moving components exceeds a threshold, the torque limiter may slip, thus allowing the components to move relative to each other. For example, in one embodiment, a torque limiter may be interposed between an interior surface of a pinion and an exterior surface of an input axle in a spur gear. When an amount of torque exceeds a threshold, the pinion may rotate while the input axle remains stationary. In another embodiment, a torque limiter may be interposed between an interior surface of a worm wheel and an exterior surface of an output axle in a worm gear. When an amount of torque exceeds a threshold, the output axle may rotate while the worm wheel remains stationary.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the accompanying drawings in which.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
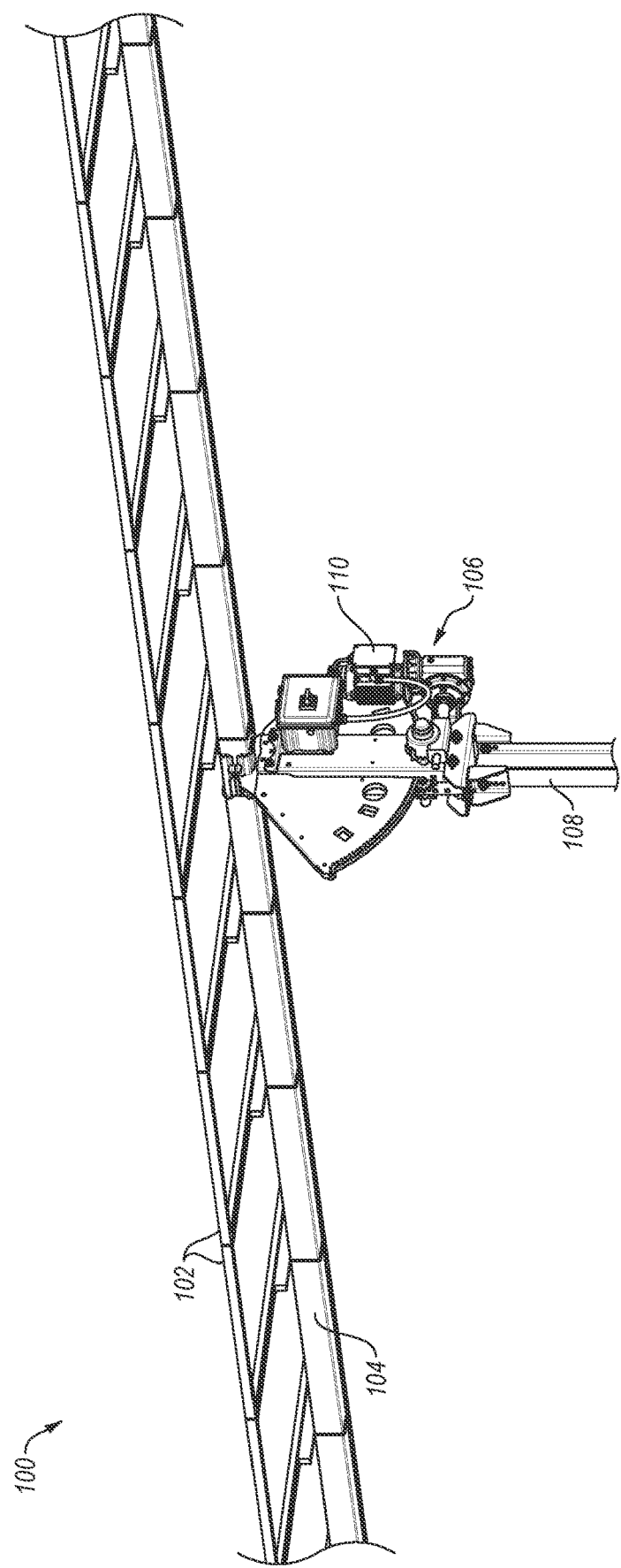
FIG. 1 illustrates an exemplary solar tracking system.

FIG. 1 illustrates an exemplary solar tracking system 100. The system 100 includes a plurality of PV modules 102, a PV module mounting structure 104, a tracker drive assembly 106, and a support structure 108. The plurality of PV modules 102 are coupled to the PV module mounting structure 104. The tracker drive assembly 106 is mounted on the support structure 108 and coupled to the PV module mounting structure 104.

In the system 100, the PV module mounting structure 104 is a torque tube (which is hereafter referred to as torque tube 104). However, in other embodiments, a PV module mounting structure may include a box frame, a ladder frame, a space frame, or another frame or structure suitable for mounting PV modules.

Tracker drive assemblies that are used in solar tracking systems are configured to rotate PV module mounting structures, such as torque tubes, through a number of different components. For example, tracker drive assembly 106 includes a drive motor 110 that rotates a drive shaft (not shown). The tracker drive assembly 106 may also include one or more gears, axles, and other internal components (not shown) to rotate the torque tube 104 and the plurality of PV modules 102 relative to the support structure 108. Gears in the tracker drive assembly 106 may include parallel axis gears in which an input axle and an output axle are parallel. Parallel axis gears include, but are not limited to, spur gears and helical gears. Gears in the tracker drive assembly 106 may also include nonparallel axis (intersecting axis and staggered shaft) gears. Nonparallel axis gears change an axis of rotation between an input axle and an output axle and include, but are not limited to, screw gears, worm gears, bevel gears, miter gears.

Wind, uneven snow buildup, seismic activities, and other events can cause a torque to be applied to the tracker drive assembly through the torque tube 104. This torque can cause damage to many different parts of the solar tracking system 100, including but not limited to the components of a tracker drive assembly, such as the drive motor and the gears. To prevent transmission of excessive torque, the tracker drive assembly 106 also includes at least one torque limiter (not shown). Exemplary embodiments and implementations of torque limiters are provided in FIGS. 2-6.

Modifications, additions, or omissions may be made to the system 100 without departing from the scope of the disclosure. For example, the designations of different elements in the manner described is meant to help explain concepts described herein and is not limiting. Further, the system 100 may include any number of other elements or may be implemented within other systems or contexts than those described. For example, in other embodiments, the PV module mounting structure may include something other than a torque tube, such as a box frame, a ladder frame, a space frame or another frame or structure for mounting PV modules.

Figure 2A:
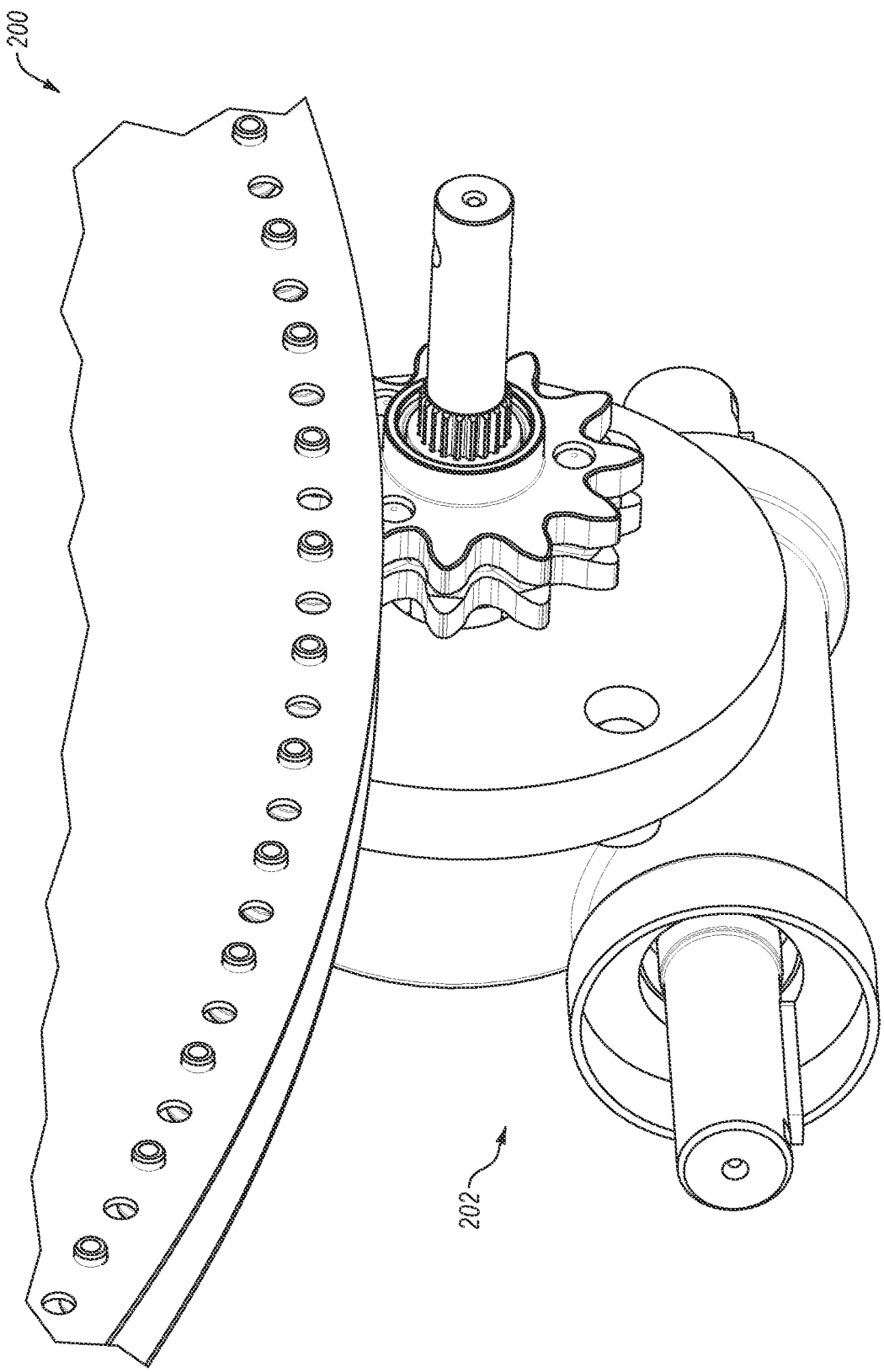
FIGS. 2A-2E illustrates a variety of views and components of a spur gear that includes an exemplary torque limiter.
Figure 2B:
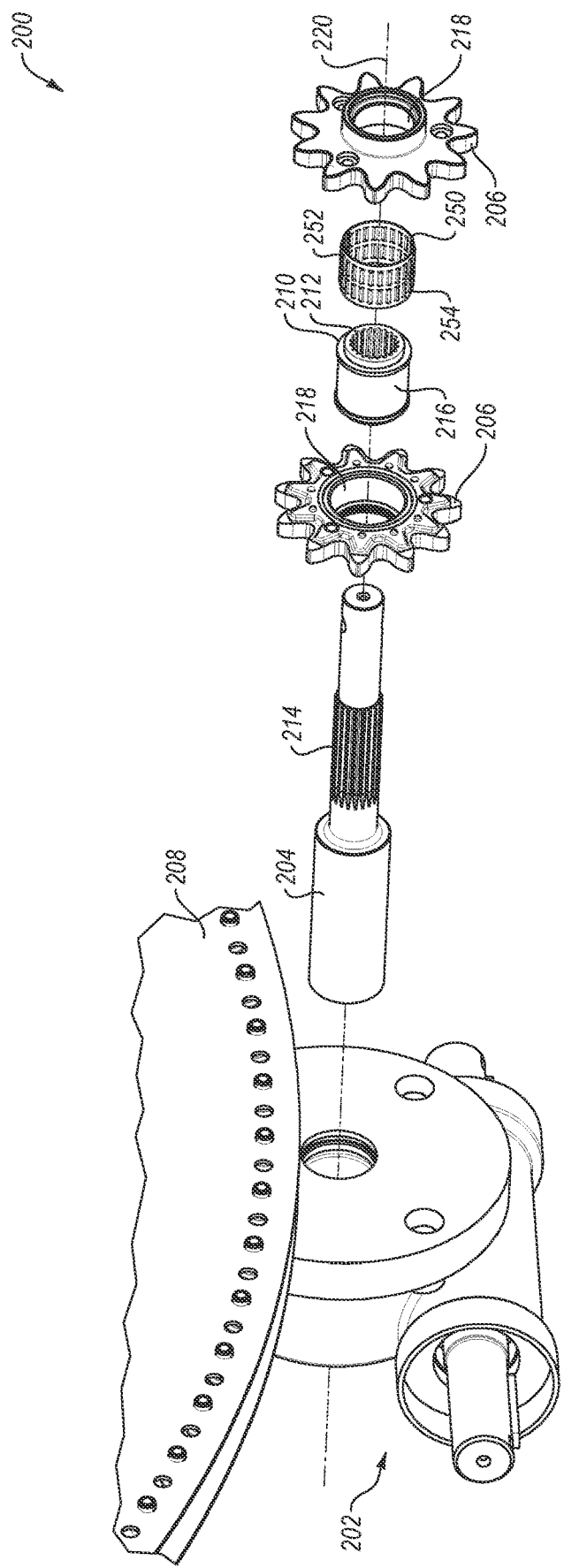

FIGS. 2A-2E illustrate a spur gear 200, which may be part of the tracker drive assembly 106 illustrated in FIG. 1. FIG. 2A illustrates the spur gear 200 implemented in a tracker drive assembly that also includes a worm gear 202. FIG. 2B is an exploded perspective view of the spur gear 200. As can be seen in FIG. 2B, the spur gear 200 includes an input axle 204, a pinion 206, a toothed wheel 208, and an output axle (not shown) at the center of the toothed wheel 208. In some embodiments, the output axle may be a PV module mounting structure, such as a torque tube, in a solar tracking system. The input axle 204 is also an output axle of the worm gear 202. However, in other embodiments, the input axle may be a drive shaft of a drive motor. Components of the spur gear 200 are shown separated along a central axis 220 of the input axle 204.

The spur gear 200 also includes a spacer 210 that includes an interior surface 212 that is configured to be coupled to an exterior surface 214 of the input axle 204 and an exterior surface 216 that is configured to be coupled to an interior surface 218 of the pinion 206. A friction ring 250 is interposed between the interior surface 218 of the pinion 206 and the exterior surface 214 of the input axle 204. More specifically, the friction ring 250 is interposed between the exterior surface 216 of the spacer 210 and the interior surface 218 of the pinion 206.

The friction ring 250 may be configured to allow slippage or movement between the input axle 204 and the pinion 206 when a torque between the input axle 204 and the pinion 206 exceeds a threshold. The friction ring 250 may include a plurality of tines 252 that protrude from an exterior surface 254 of the friction ring 250. The tines 252 may be configured to provide a frictional force between the input axle 204 and the pinion 206. The tines 252 on the friction ring 250 extend around the entire exterior surface 254 and are split into two separate rows. In other embodiments, there may be more or fewer than two separate rows. For example, a friction rings could have a single row of times or more than 2. In addition, the tines on a friction ring may not extend around an entire exterior surface of the friction ring. Alternatively, there may exist more space between adjacent tines such that there are fewer tines on a friction ring.

A number of tines, or other features on a friction ring, may be directly related to the threshold amount of torque necessary for the friction ring to allow slippage. A circumference of a friction ring may also be directly related to the threshold amount of torque necessary for the friction ring to allow slippage. For example, as the circumference of a friction ring increases, the amount of torque necessary for the friction ring to allow slippage may also increase. Alternatively or additionally, to increase the amount of torque necessary for the friction ring to allow slippage, additional tines may be added to a friction ring, additional rows of tines may be added to a friction ring, or the material thickness of the friction ring may be increased.

Figure 2D:
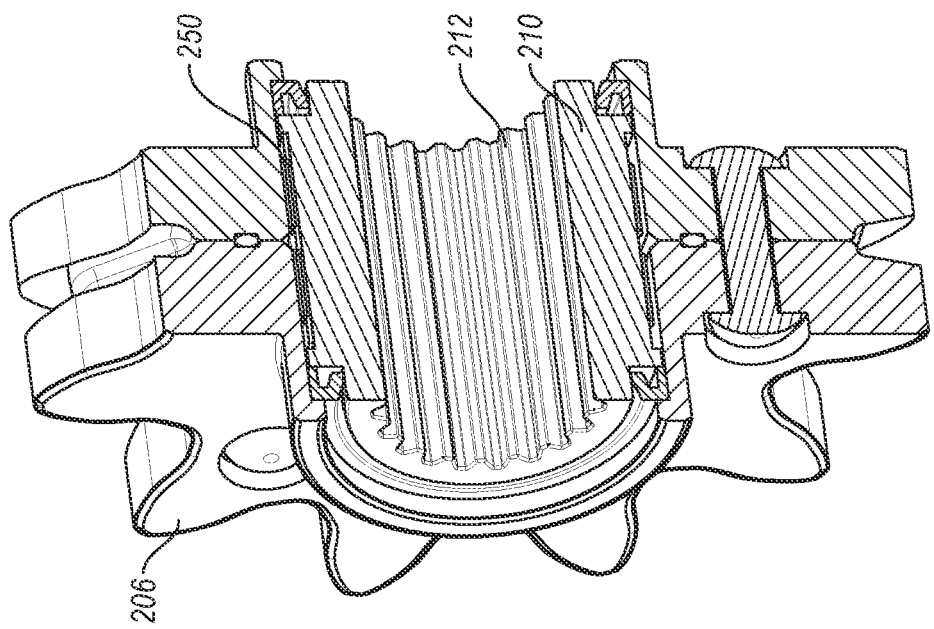
Figure 2C:
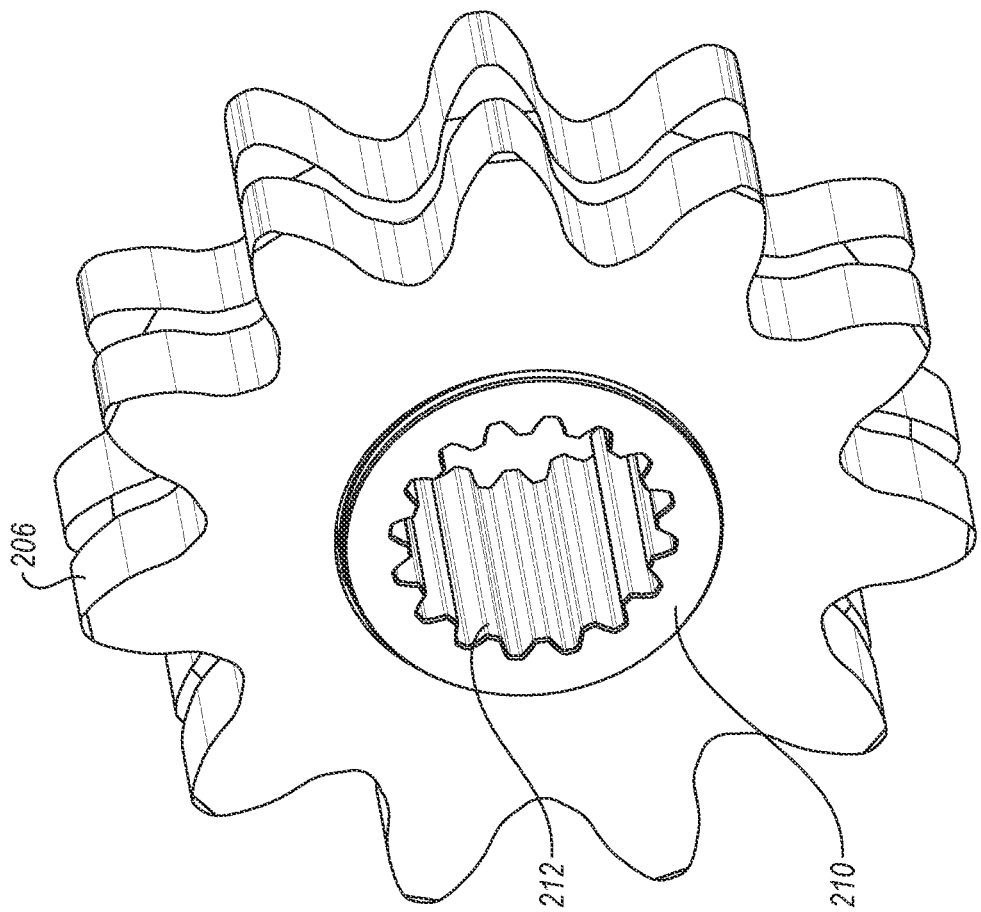
Figure 2E:
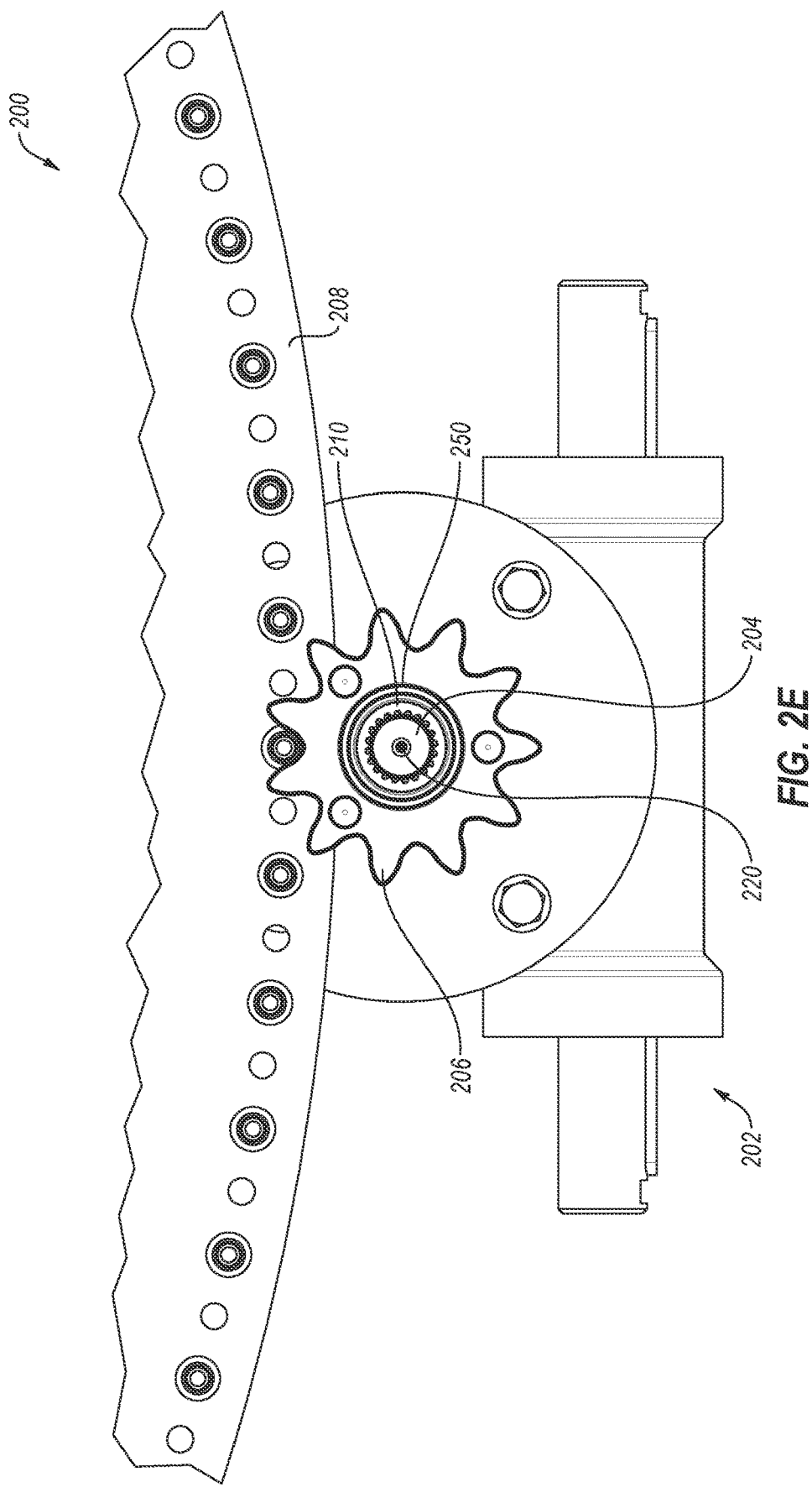

FIG. 2C illustrates a perspective view of the pinion 206 with the spacer 210 inserted. The interior surface 212 is shaped to be coupled to the exterior surface 214 of the input axle 204 shown in FIG. 2B. Although it cannot be seen in FIG. 2C, the friction ring 250 is interposed between the exterior surface 216 of the spacer 210 and the interior surface 218 of the pinion 206. For example, FIG. 2D illustrates a cross sectional view of the pinion 206 with the spacer 210 inserted in which the friction ring 250 can be seen. The friction ring 250 is configured such that when an amount of torque between the pinion 206 and the spacer 210 exceeds a threshold, slippage between these components will occur. FIG. 2E illustrates a cross sectional view of the spur gear 200 along the axis 220. In another embodiment, a spacer may not be present. In this embodiment, the friction ring may be attached to an exterior surface of an input axle and interposed between the input axle and a pinion.

In some embodiments, two or more spur gears may be used to allow different segments of a PV module mounting structure to slip independently. For example, in one embodiment, an input axle (which may be a drive shaft) may engage two separate toothed wheels through two separate pinions. A first friction ring may be interposed between the input axle and the first pinion and a second friction ring may be interposed between the input axle and the second pinion. Each toothed wheel may be coupled to different segments of a PV module mounting structure. The different segments of the PV module mounting structure may lack a direct connection such that each segment is able to slip independently of the other.

Figure 3A:
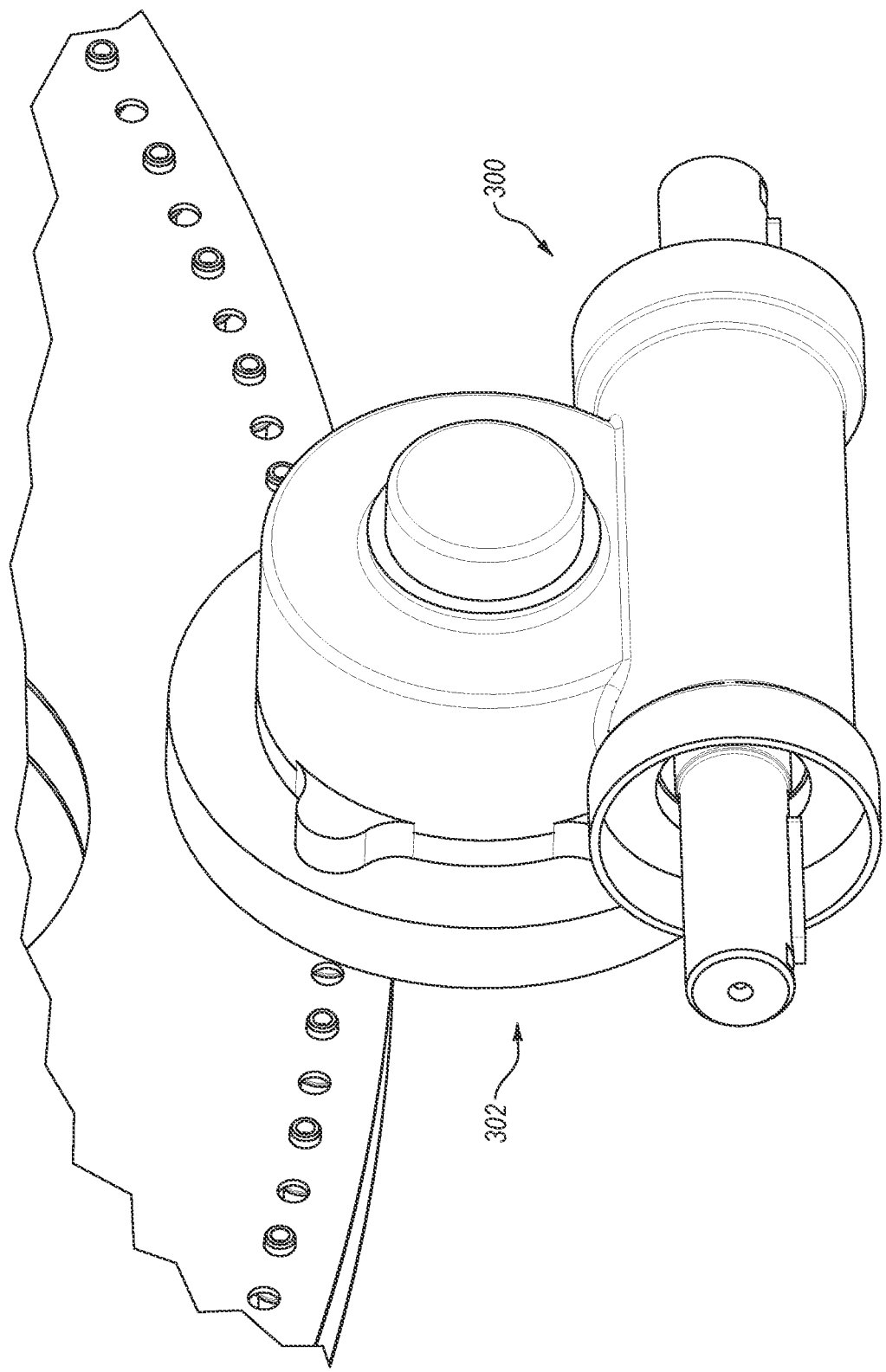
FIGS. 3A-3C illustrates a variety of views and components of a worm gear that includes an exemplary torque limiter.
Figure 3B:
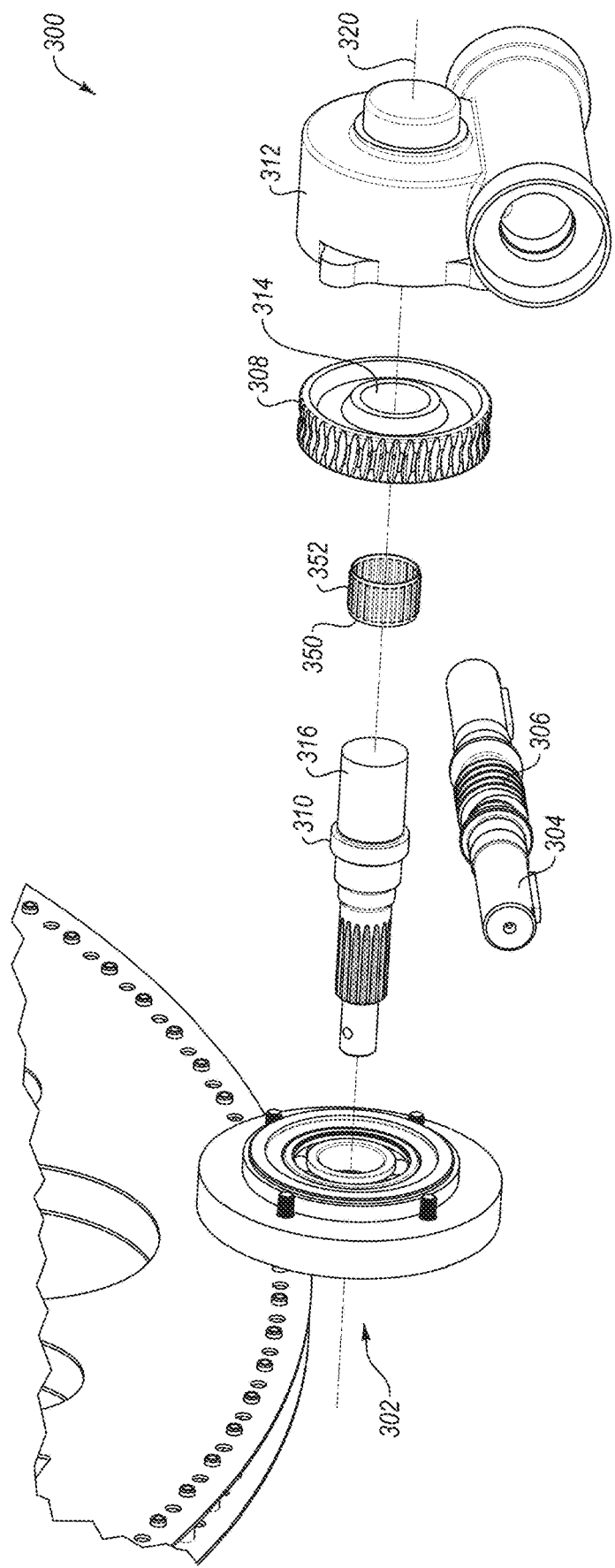
Figure 3C:
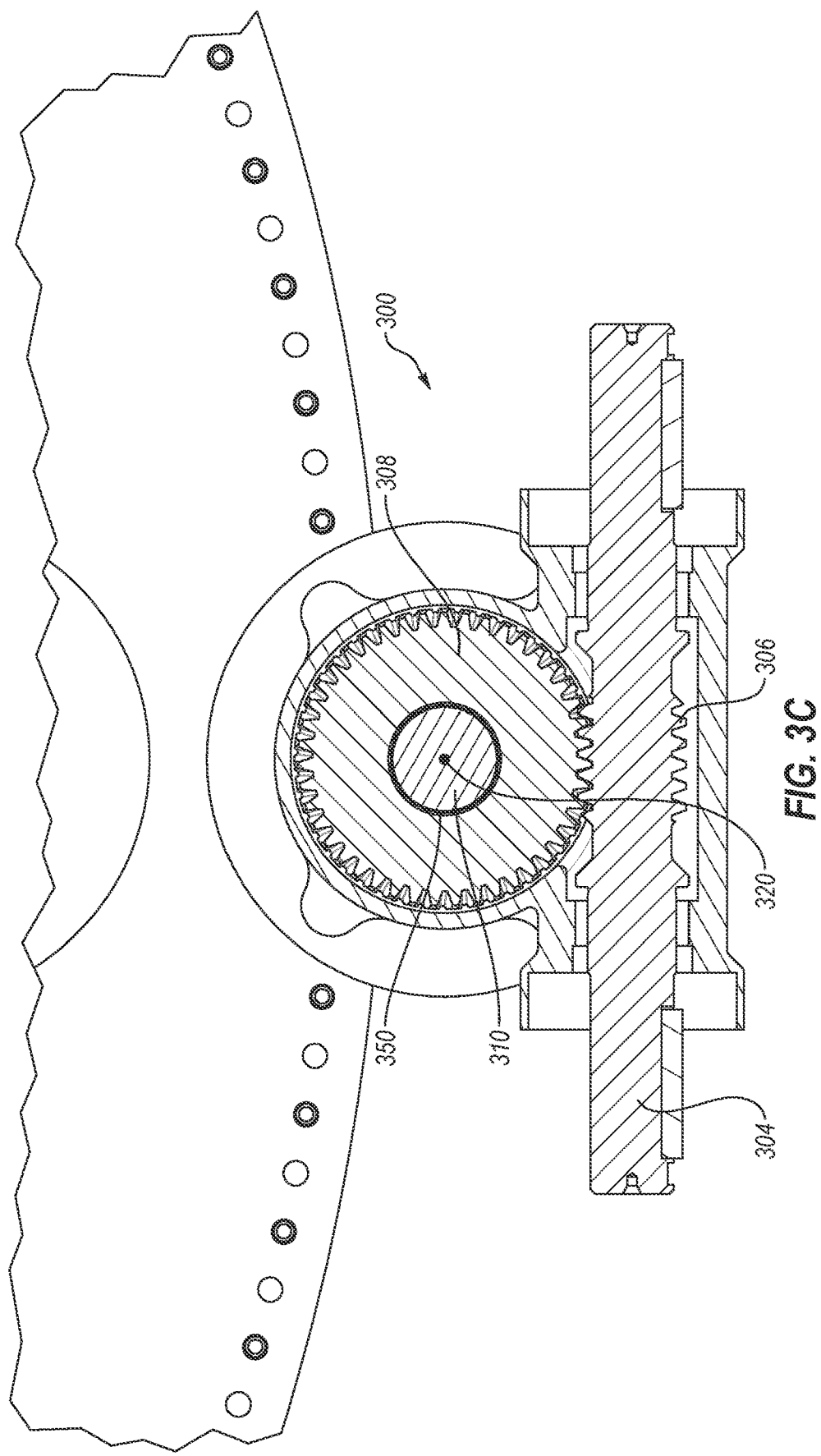

FIGS. 3A-3C illustrate a worm gear 300, which may be part of the tracker drive assembly 106 illustrated in FIG. 1. FIG. 3A illustrates the worm gear 300 implemented in a tracker drive assembly that also includes a spur gear 302. FIG. 3B is an exploded perspective view of the worm gear 300. As can be seen in FIG. 3B, the worm gear 300 includes an input axle 304, a worm 306 on an exterior surface of the input axle 304, a worm wheel 308, an output axle 310, and a housing 312. The output axle 310 is also the input axle for the spur gear 302. In other embodiments, the output axle 310 may be a PV module mounting structure, such as a torque tube. The input axle 304 may also be a drive shaft of a drive motor. Components of the worm gear 300 are shown separated along a central axis 320 of the output axle 310.

A friction ring 350 is interposed between an interior surface 314 of the worm wheel 308 and an exterior surface 316 of the output axle 310. The friction ring 350 may be configured to allow slippage or movement between the worm wheel 308 and the output axle 310 when a torque between the worm wheel 308 and the output axle 310 exceeds a threshold. The friction ring 350 may include a plurality of tines 352 that protrude from an exterior surface of the friction ring 350. The tines 352 may be configured to provide a frictional force between the worm wheel 308 and the output axle 310. The tines 352 on the friction ring 350 extend around the entire exterior surface of the friction ring 350 and span substantially the entire width of the friction ring 350. In other embodiments, two or more separate friction rings may be used to provide a frictional force between moving components.

FIG. 3C illustrates a cross sectional view of the worm gear 300 along the axis 320. A circumference of a friction rings may also be directly related to the threshold amount of torque necessary for the friction ring to allow slippage. For example, as the circumference of a friction ring increases, the amount of torque necessary for the friction ring to allow slippage may also increase. Thus, an intermediate ring may be used to increase the circumference of a friction ring.

Figure 4:
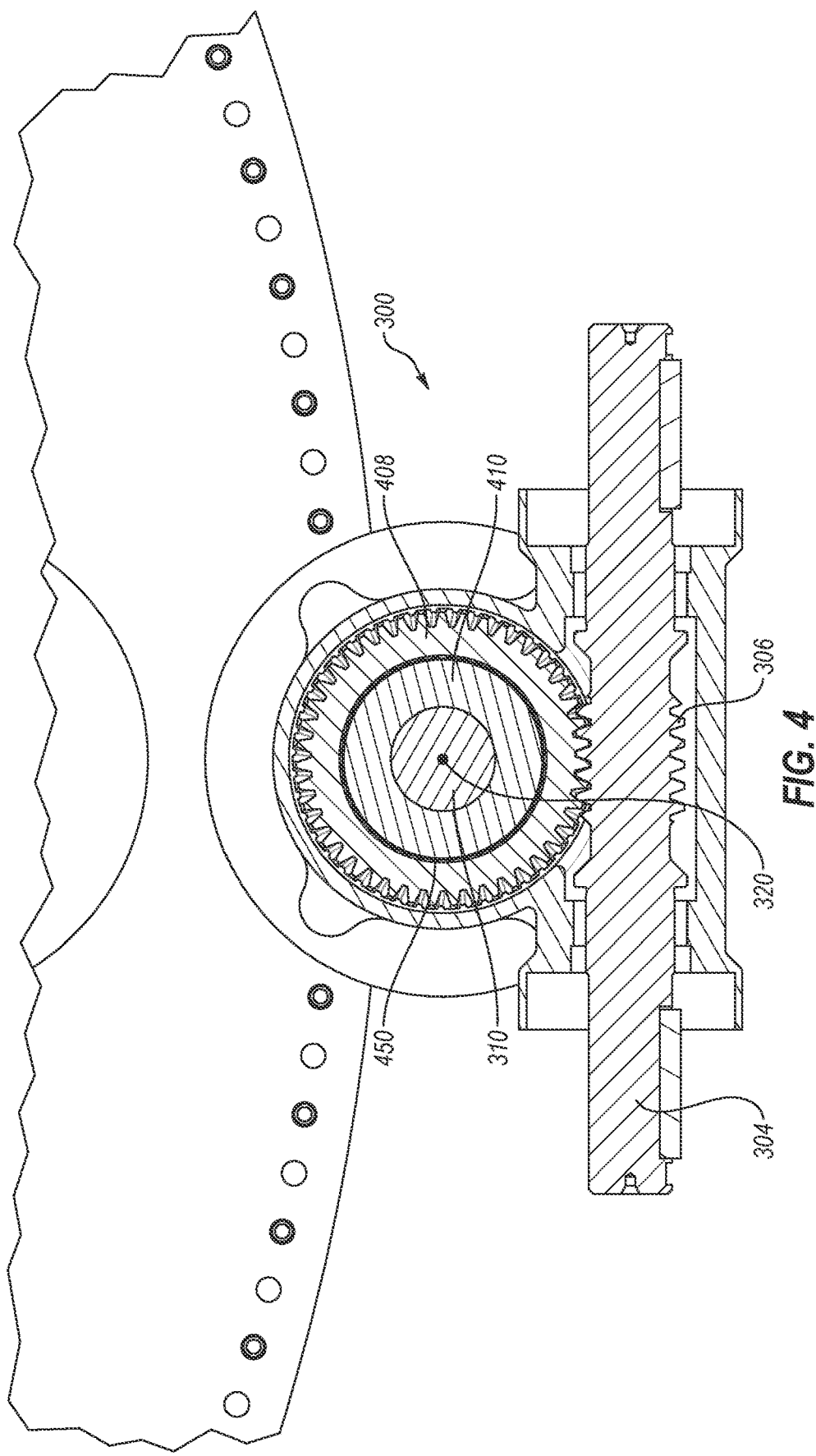
FIG. 4 illustrates another exemplary torque limiter used with the worm gear shown in FIGS. 3A-3C.

For example, FIG. 4 illustrates a cross sectional view of the input axle 304, the worm 306 on an exterior surface of the input axle 304, and the output axle 310 of worm gear 300 along the axis 320. However, a worm wheel 408 having a larger diameter opening is used in place of the worm wheel 308. To fill this extra space between the output axle 310 and the worm wheel 408, an intermediate ring 410 is coupled to the output axle 310. A friction ring 450 is interposed between the intermediate ring 410 and the output axle 310. Because the friction ring 450 has a larger circumference than the friction ring 350, the threshold amount of torque for slippage to occur between the intermediate ring 410 and the output axle 310 is larger than the threshold amount of torque for slippage to occur between the worm wheel 308 and the output axle 310.

Figure 5A:
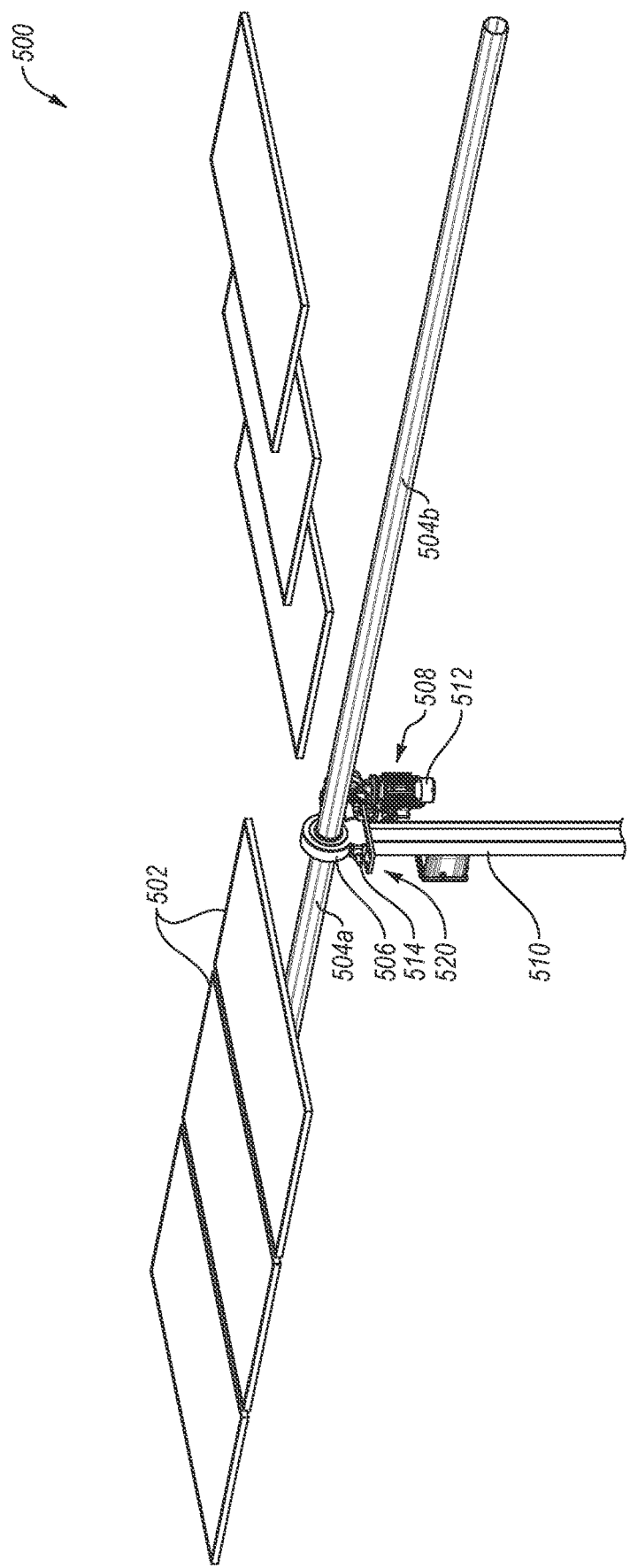
FIGS. 5A-5D illustrate a variety of views and components of an exemplary solar tracking system that includes another exemplary torque limiter.

FIGS. 5A-5D illustrate a variety of views and components of an exemplary solar tracking system 500. As shown in FIG. 5A, the system 500 includes a plurality of PV modules 502, a first PV module mounting structure segment 504a, a second PV module mounting structure segment 504b, a connector 506, a tracker drive assembly 508, and a support structure 510. In the system 500, the PV module mounting structure segment 504a and the PV module mounting structure segment 504b are torque tube segments (which are hereafter referred to as torque tube segment 504a and torque tube segment 504b, respectively). However, in other embodiments, PV module mounting structure segments may include segments of a box frame, a ladder frame, a space frame or another frame or structure suitable for mounting PV modules.

The plurality of PV modules 502 are coupled to the torque tube segments 504a and 504b (PV modules on the torque tube segment 504b are lifted to better see elements of the tracker drive assembly 508). The connector 506 couples ends of the first and second torque tube segments 504a and 504b to create an elongated torque tube. The connector 506 may comprise a single component or multiple connected components. The tracker drive assembly 508 is mounted on the support structure 510 and is configured to rotate the connector 506 and the first and second torque tube segments 504a and 504b relative to the support structure 510. The tracker drive assembly 508 includes a drive motor 512 that rotates a drive shaft 514. The tracker drive assembly 508 also includes a worm gear 520.

Wind, uneven snow buildup, seismic activities, and other events can cause a torque to be applied to the tracker drive assembly 508 through the connector 506. This torque can cause damage to many different parts of the solar tracking system 500, including but not limited to the components of the worm gear 520, the drive motor 512, and other components of the tracker drive assembly 508.

Figure 5B:
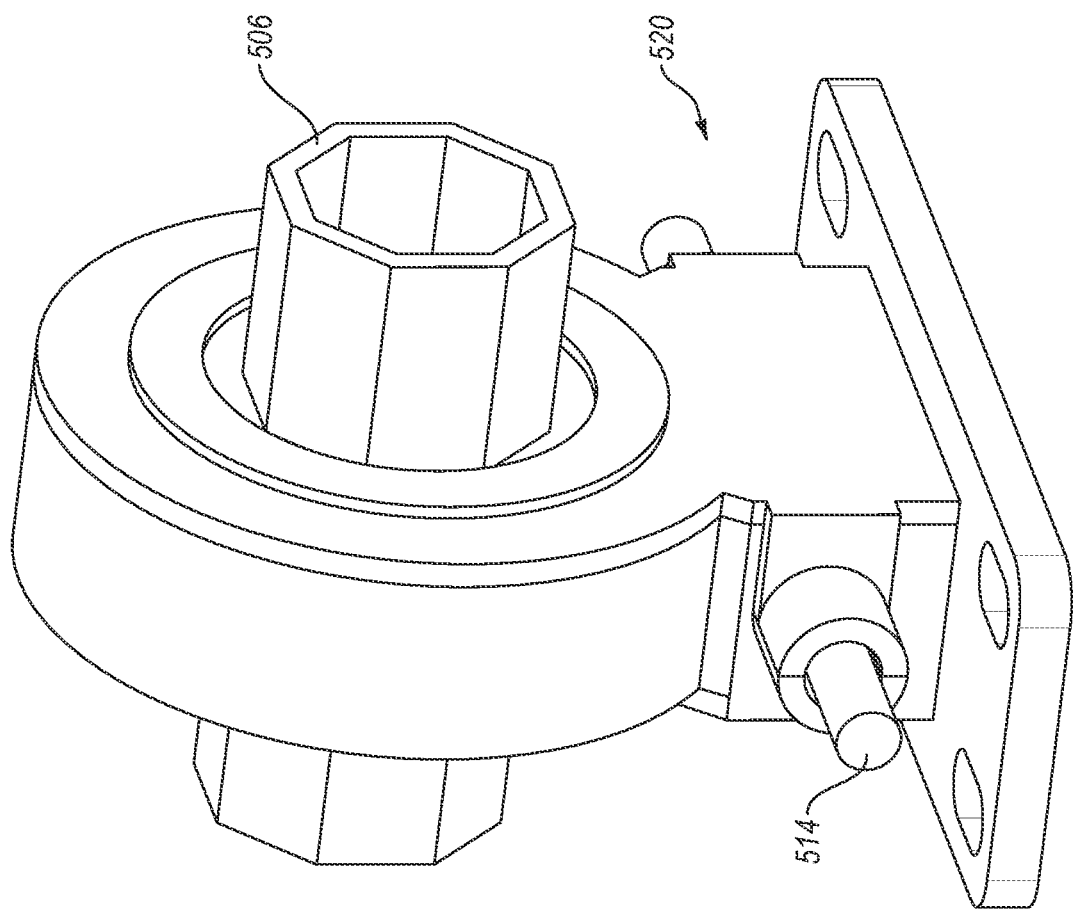
Figure 5C:
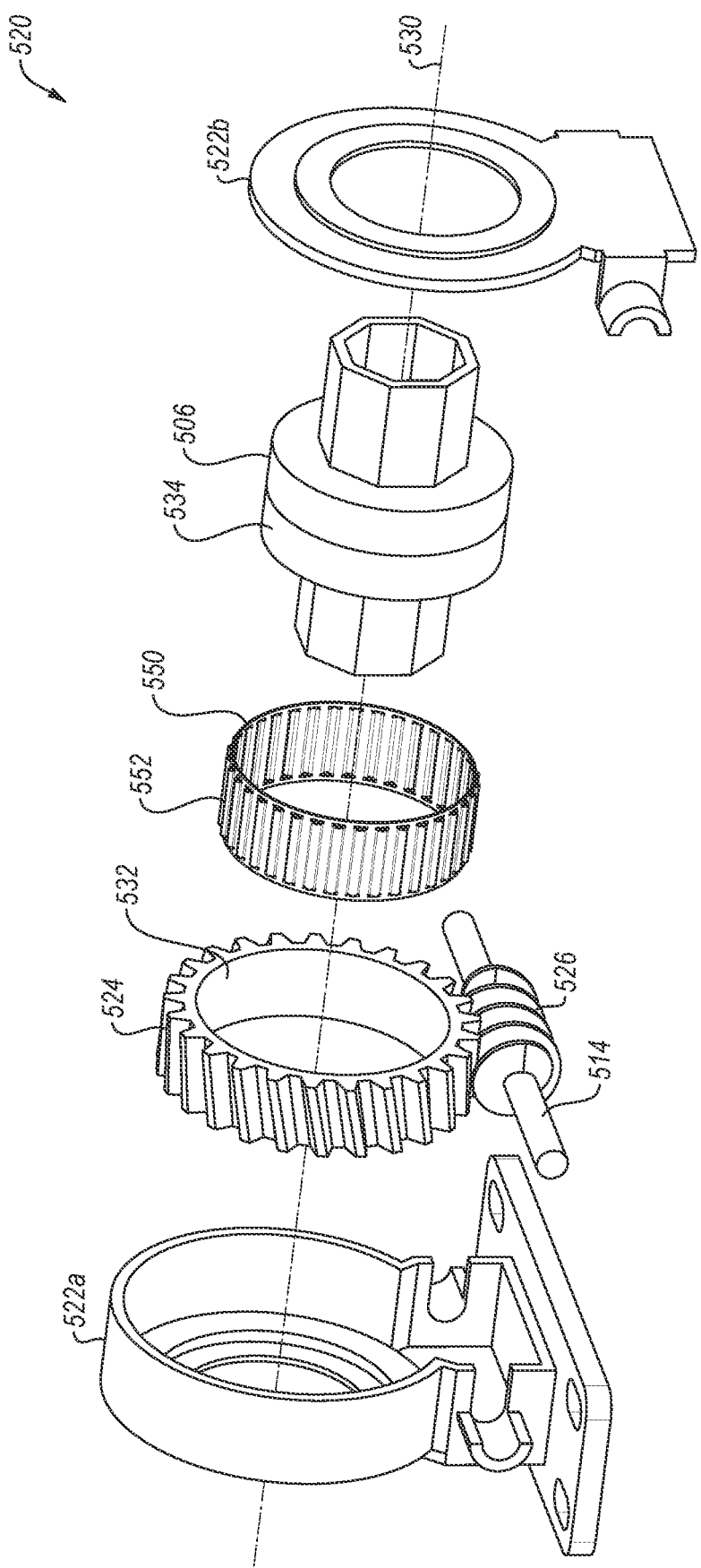

FIG. 5B illustrates a perspective view of the worm gear 520 the connector 506 and FIG. 5C illustrates an exploded perspective view of these components. As can be seen in FIG. 5C, the worm gear 520 includes a housing 522a and 522b, a worm wheel 524, an input axle (which is also the drive shaft 514), and a worm 526 on an exterior surface of the drive shaft 514. Components of the worm gear 520 are shown separated along a central axis 530 of the connector 506.

Figure 5D:
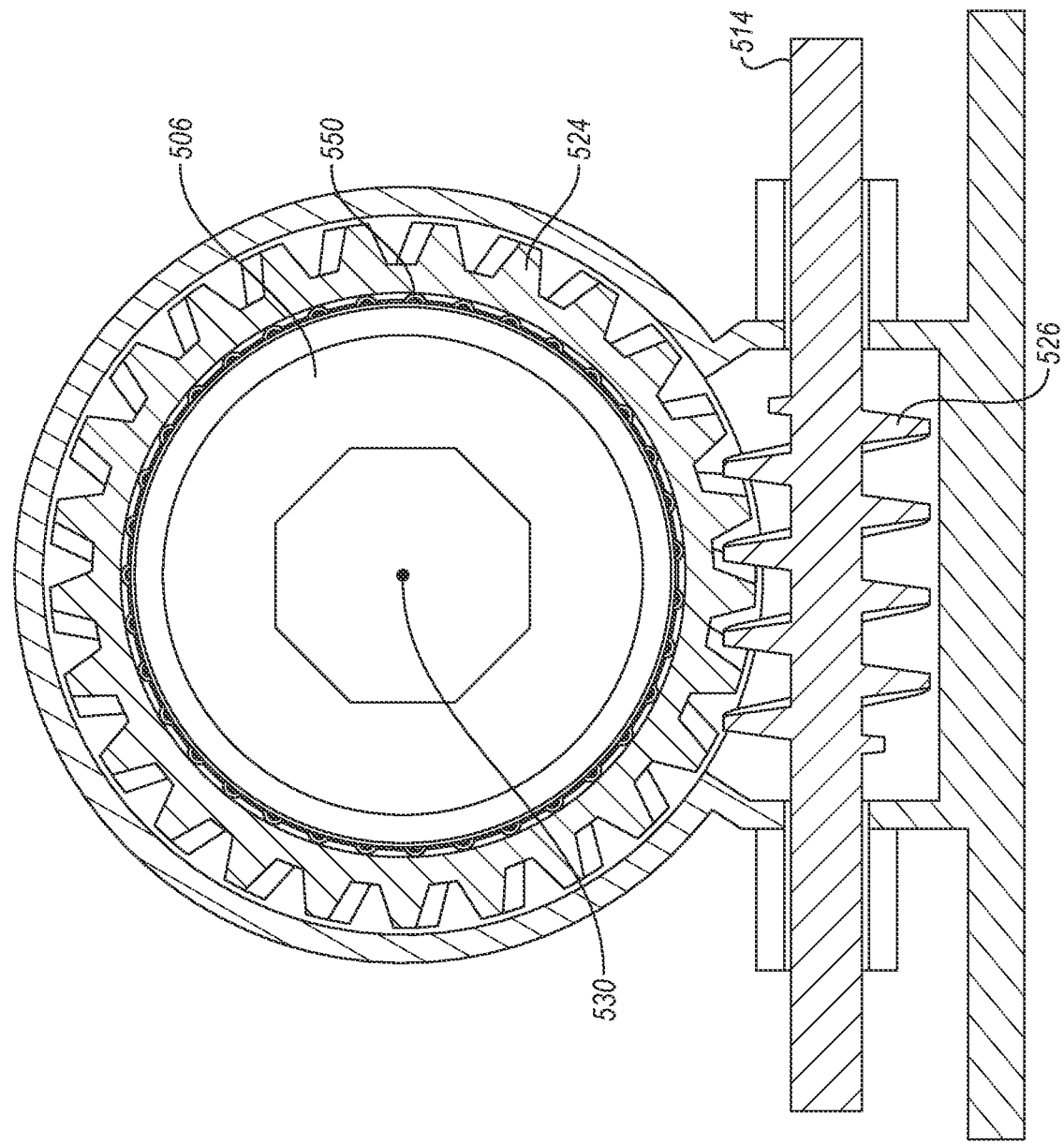

To alleviate the torque that can be generated on the components of the worm gear 520, the drive motor 512, and other components of the tracker drive assembly 508, the tracker drive assembly 508 also includes a friction ring 550. The friction ring 550 is interposed between an interior surface 532 of the worm wheel 524 and an exterior surface 534 of the connector 506. The friction ring 550 may be configured to allow slippage or movement between the worm wheel 524 and the connector 506 when a torque between the worm wheel 524 and the connector 506 exceeds a threshold. The friction ring 350 may include a plurality of tines 552 that protrude from an exterior surface of the friction ring 550. The tines 552 may be configured to provide a frictional force between the worm wheel 524 and the connector 506. The tines 552 on the friction ring 550 extend around the entire exterior surface of the friction ring 550 and span substantially the entire width of the friction ring 550. FIG. 5D illustrates a cross sectional view of the worm gear 520 along the axis 530.

Modifications, additions, or omissions may be made to the system 500 without departing from the scope of the disclosure. For example, the designations of different elements in the manner described is meant to help explain concepts described herein and is not limiting. Further, the system 500 may include any number of other elements or may be implemented within other systems or contexts than those described.

Figure 6:
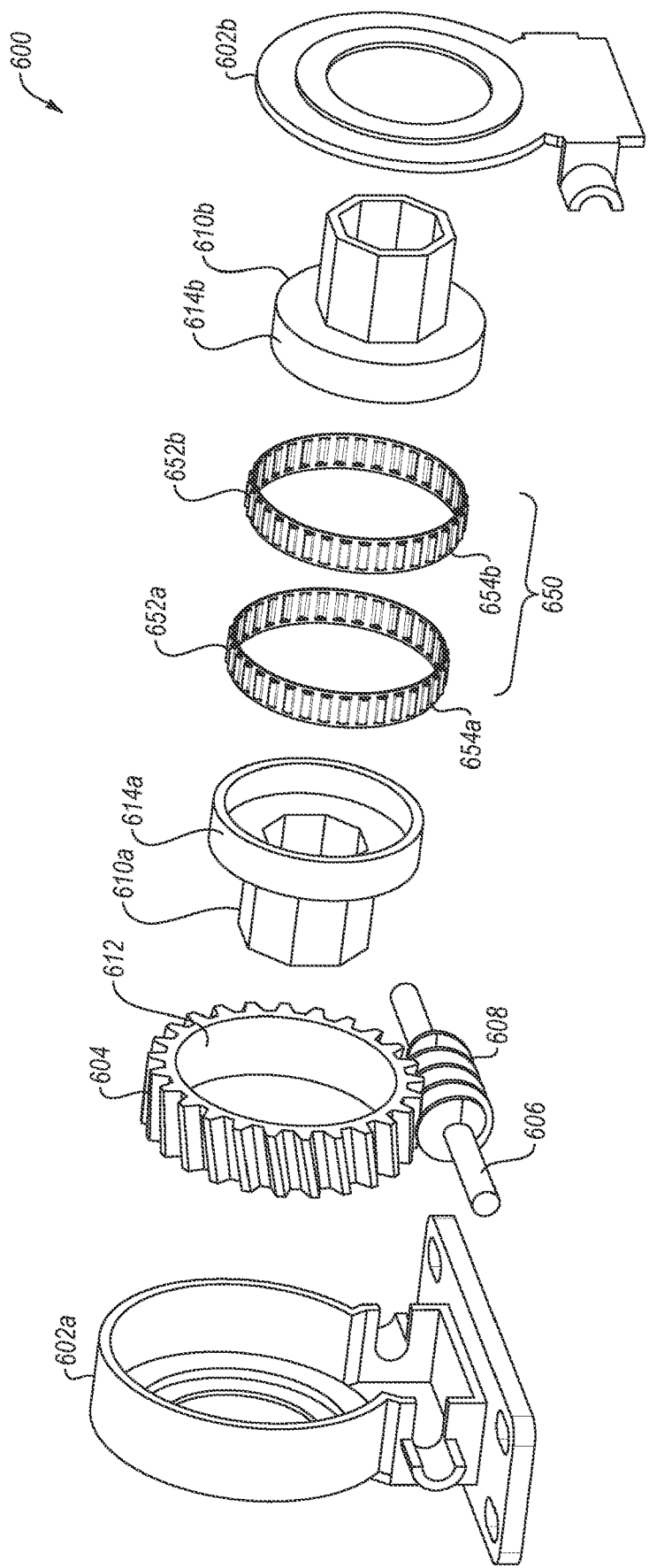
FIG. 6 illustrates another exemplary worm gear and torque limiter configured to be used in the solar tracking system shown in FIG. 5A.

FIG. 6 illustrates an exploded perspective view another exemplary worm gear 600 and torque limiter configured to be used in the solar tracking system shown in FIG. 5A. As can be seen in FIG. 6, the worm gear 600 includes a housing 602a and 602b, a worm wheel 604, an input axle 606 (which may also be a drive shaft from a drive motor), a worm 608 on an exterior surface of the drive shaft 606, a first connector component 610a, and a second connector component 610b. The first and second connectors 610a and 610b may be configured to couple separate PV module mounting structure segments to create an elongated PV module mounting structure.

A torque limiter 650 may be positioned within the worm gear 600 to alleviate the torque that can be generated on the components of the worm gear 600 and other components of a tracker drive assembly of which the worm gear 600 is a part. The torque limiter 650 includes a first friction ring 652a and a second friction ring 652b. The first friction ring 652a is interposed between an interior surface 612 of the worm wheel 604 and an exterior surface 614a of the first connector component 610a. The second friction ring 652b is interposed between an interior surface 612 of the worm wheel 604 and an exterior surface 614b of the second connector component 610b. First and second friction rings 652a and 652b may include a plurality of tines 654a and 654b that protrude from exterior surfaces of the first and second friction rings 652a and 652b.

The first friction ring 652a may be configured to allow slippage or movement between the worm wheel 604 and the first connector component 610a when a torque between the worm wheel 604 and the first connector component 610a exceeds a threshold. Similarly, the second friction ring 652b may be configured to allow slippage or movement between the worm wheel 604 and the second connector component 610b when a torque between the worm wheel 604 and the second connector component 610b exceeds a threshold.

Because the first and second connectors 610a and 610b are separate components, the PV module mounting structure segments that they couple are able to slip independently of each other. In other words, the first and second connectors 610a and 610b allow independent torque limitation of first and second PV module mounting structure sections that are coupled to the first and second connectors 610a and 610b. Thus, for example, if the torque between the worm wheel 604 and the first connector component 610a exceeds a threshold while the torque between the worm wheel 604 and the second connector component 610b does not exceed the threshold, only the first friction ring 652a, where the torque exceeds the threshold, will allow slippage.

What is claimed is:

1. A torque limiting mechanism in a solar tracking system comprising:
    a drive motor configured to rotate a drive shaft;
    at least one gear configured to translate rotation of the drive shaft into rotation of a photovoltaic (PV) module mounting structure; and
    a torque limiter interposed between an interior surface of a first component of the at least one gear and an exterior surface of a second component of the at least one gear, wherein the torque limiter is a friction ring that is configured to allow the first component to slip relative to the second component when an amount of torque between the first and second components exceeds a threshold.

2. The torque limiting mechanism of claim 1, wherein the friction ring includes a plurality of tines that protrude from a surface of the friction ring.

3. The torque limiting mechanism of claim 1, further comprising an intermediate ring interposed between the friction ring and at least one of the interior surface of a first component and the exterior surface of the second component.

4. The torque limiting mechanism of claim 1, wherein the PV module mounting structure is a torque tube.

5. The torque limiting mechanism of claim 1, wherein the at least one gear is a parallel axis gear.

6. The torque limiting mechanism of claim 5, wherein:
    the parallel axis gear includes a spur gear comprising a toothed wheel, a pinion, an input axle, and an output axle, and
    the friction ring is interposed between an interior surface of the pinion and an exterior surface of the input axle.

7. The torque limiting mechanism of claim 6, wherein:
    the spur gear further comprises a spacer having an interior surface and an exterior surface, and
    the interior surface is coupled to the input axle and the friction ring is interposed between the exterior surface of the spacer and the interior surface of the pinion.

8. The torque limiting mechanism of claim 6, wherein the input axle is the drive shaft and the output axle is the PV module mounting structure.

9. The torque limiting mechanism of claim 1, wherein the at least one gear is an intersecting axis gear.

10. The torque limiting mechanism of claim 9, wherein:
    the intersecting axis gear includes a worm gear comprising a worm wheel, a worm, an input axle, and an output axle, and
    the friction ring is interposed between an interior surface of the worm wheel and an exterior surface of the output axle.

11. The torque limiting mechanism of claim 10, further comprising a parallel axis gear including a pinion, wherein the input axle is the drive shaft and the output axle rotates the pinion of the parallel axis gear.

12. The torque limiting mechanism of claim 10, wherein:
    the output axle includes a connector that that couples a first PV module mounting structure segment with a second PV module mounting structure segment, and
    the friction ring is interposed between an interior surface of the worm wheel and an exterior surface of the connector.

13. The torque limiting mechanism of claim 12, wherein:
    the connector includes a first connector component that is coupled to the first PV module mounting structure segment and a second connector component that is coupled to the second PV module mounting structure segment to allow independent torque limitation of the first and second PV module mounting structure segments, and
    the friction ring includes a first ring interposed between an interior surface of the worm wheel and an exterior surface of the first connector component and a second ring interposed between an interior surface of the worm wheel and an exterior surface of the second connector component.

14. A torque limiting mechanism in a solar tracking system comprising:
    a drive motor configured to rotate a drive shaft;
    a worm gear comprising a worm wheel, a worm, an input axle, and an output axle, wherein:
        the output axle includes a first photovoltaic (PV) module mounting structure segment, a second PV module mounting structure segment, and a connector that couples the first PV module mounting structure segment with the second PV module mounting structure segment, and the worm gear is configured to translate rotation of the drive shaft into rotation of the output axle; and a torque limiter, interposed between an interior surface of the worm wheel and an exterior surface of the connector, that is configured to allow the worm wheel to slip relative to the connector when an amount of torque between the interior surface of the worm wheel and the exterior surface of the connector exceeds a threshold.

15. The torque limiting mechanism of claim 13, wherein the torque limiter is a friction ring that includes a plurality of tines that protrude from a surface of the friction ring.

16. The torque limiting mechanism of claim 13, wherein the connector includes a first connector component that is coupled to the first PV module mounting structure segment and a second connector component that is coupled to the second PV module mounting structure segment to allow independent torque limitation of the first and second PV module mounting structure segments.

17. The torque limiting mechanism of claim 16, wherein the torque limiter includes a first friction ring interposed between an interior surface of the worm wheel and an exterior surface of the first connector component and a second friction ring interposed between an interior surface of the worm wheel and an exterior surface of the second connector component.

18. A torque limiting mechanism in a solar tracking system comprising:

a drive motor configured to rotate a drive shaft;

a spur gear comprising a toothed wheel, a pinion, an input axle, and an output axle, wherein the spur gear is configured to translate rotation of the drive shaft into rotation of the output axle; and a torque limiter, interposed between an interior surface of the pinion and an exterior surface of the input axle, that is configured to allow the interior surface of the pinion to slip relative to the exterior surface of the input axle when an amount of torque between the pinion and the input axle exceeds a threshold.

19. The torque limiting mechanism of claim 18, wherein the input axle is the drive shaft.

20. The torque limiting mechanism of claim 18, wherein:

the torque limiter is a friction ring;

the spur gear further comprises a spacer having an interior surface and an exterior surface, and the interior surface is coupled to the input axle and the friction ring is interposed between the exterior surface of the spacer and the interior surface of the pinion.

\* \* \* \* \*